(12) United States Patent
Rha et al.

(10) Patent No.: US 8,133,575 B2
(45) Date of Patent: Mar. 13, 2012

(54) ARTIFICIAL STONE AND METHOD OF PREPARING THE SAME

(75) Inventors: Do Choon Rha, Seoul (KR); Eung Seo Park, Yeous-si (KR); Jae Wook Juen, Seoul (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 1059 days.

(21) Appl. No.: 11/808,050

(22) Filed: Jun. 6, 2007

(65) Prior Publication Data

US 2007/0281114 A1  Dec. 6, 2007

Related U.S. Application Data

(63) Continuation of application No. PCT/KR2005/004239, filed on Dec. 12, 2005.

(30) Foreign Application Priority Data

Dec. 13, 2004  (KR) .................. 10-2004-0104771

(51) Int. Cl.
  *B32B 3/00* (2006.01)
  *B32B 5/16* (2006.01)
  *B32B 7/00* (2006.01)
  *B32B 21/08* (2006.01)
  *C09K 11/02* (2006.01)

(52) U.S. Cl. ........ 428/205; 428/206; 428/207; 428/208; 428/210; 428/543; 252/301.33; 252/301.34; 252/301.35

(58) Field of Classification Search ................. None
See application file for complete search history.

(56) References Cited

U.S. PATENT DOCUMENTS

| | | | |
|---|---|---|---|
| 6,146,548 A * | 11/2000 | Sakai ..................... | 252/301.36 |
| 6,309,562 B1 * | 10/2001 | Sakai et al. ............. | 252/301.36 |
| 2003/0012600 A1 * | 1/2003 | Kaneko et al. .......... | 404/32 |
| 2003/0041779 A1 * | 3/2003 | Burger et al. ........... | 106/287.14 |
| 2003/0087074 A1 * | 5/2003 | Yamanashi et al. .... | 428/212 |

FOREIGN PATENT DOCUMENTS

| | | |
|---|---|---|
| JP | 05-279575 | 10/1993 |
| JP | 07-33500 | 2/1995 |
| KR | 10-1998-0036300 | 8/1998 |

* cited by examiner

*Primary Examiner* — Gordon R Baldwin
(74) *Attorney, Agent, or Firm* — Lee & Morse, P.C.

(57) ABSTRACT

An artificial stone, including a solid material and surface-treated stone elements in the solid material, wherein the surface-treated stone elements are transparent stone elements having a coloring material disposed on surfaces thereof.

19 Claims, 2 Drawing Sheets

ARTIFICIAL STONE AND METHOD OF PREPARING THE SAME

CROSS-REFERENCE TO RELATED APPLICATION

This application is a continuation of PCT Application No. PCT/KR2005/004239, entitled "ARTIFICIAL MARBLE CONTAINING THREE-DIMENSIONAL TRANSPARENT MARBLE CHIP AND METHOD FOR PREPARING THE SAME," which was filed on Dec. 12, 2005.

BACKGROUND OF THE INVENTION

1. Field of the Invention

Example embodiments relate to an artificial stone containing three-dimensional transparent stone elements and, more particularly, to an artificial stone having a sparkling pattern which resembles a stone beset with gems, and a method of preparing the same.

2. Description of the Related Art

Generally, an artificial stone may be prepared using various types of base materials. During the preparation of the artificial stone, various artificial stone elements, e.g., chips, may be added to the base material, in order to express various patterns in the resulting artificial stone. The appearance of artificial stone may greatly affect the value of the product, and thus the nature of the artificial stone elements employed therein may be an important aspect of the artificial stone.

Transparent or opaque artificial stone elements may be used in the preparation of artificial stone so as to provide the artificial stone with various patterns. However, where transparent artificial stone elements are used, the artificial stone may fail to express the three dimensionality of the transparent artificial stone elements because the shapes of buried parts of the transparent artificial stone elements are not distinct.

SUMMARY OF THE INVENTION

Embodiments are therefore directed to an artificial stone containing three-dimensional transparent stone elements and method of preparing the same, which substantially overcome one or more of the problems due to the limitations and disadvantages of the related art.

It is therefore a feature of an embodiment to provide an artificial stone containing surface-treated transparent stone elements.

It is therefore another feature of an embodiment of the present invention to provide a method of preparing artificial stone that includes selectively removing a coloring material from surface-treated stone elements exposed at a surface of the artificial stone.

At least one of the above and other features and advantages may be realized by providing an artificial stone, including a solid material, and surface-treated stone elements in the solid material, wherein the surface-treated stone elements are transparent stone elements having a coloring material disposed on surfaces thereof, and transparent portions of the surface-treated stone elements are exposed at a surface of the artificial stone.

The transparent stone elements may be entirely or partially covered by the coloring material. Surfaces of some of the surface-treated stone elements may be exposed at an outer surface of the artificial stone, and the exposed surfaces may not have the coloring material thereon. The artificial stone may include a first plurality of the surface-treated stone elements, each having a first portion within the artificial stone and a second portion exposed at a surface of the artificial stone, wherein the coloring material may be disposed on surfaces of the first portions of the first plurality of the surface-treated stone elements, and the coloring material may not be disposed on surfaces of the second portions of the first plurality of surface-treated stone elements.

The artificial stone may further includes a second plurality of surface-treated stone elements that may be entirely within the artificial stone, the second plurality of surface-treated stone elements being entirely covered by the coloring material.

The coloring material may include one or more of a paint or a metal. The coloring material may include a metal, and the metal may include one or more of gold, silver, copper, aluminum, or nickel. The transparent stone elements may include a polymer.

At least one of the above and other features and advantages may also be realized by providing a method of preparing an artificial stone, including combining a first material and surface-treated stone elements, forming the combined first material and surface-treated stone elements into a shape having an exposed surface, and processing the exposed surface so as to expose transparent portions of the surface-treated stone elements, wherein the surface-treated stone elements are transparent stone elements having a coloring material disposed on surfaces thereof.

The method may further include, prior to the combining, applying the coloring material to surfaces of the transparent stone elements to prepare the surface-treated stone elements. Preparing the surface-treated stone elements may include pulverizing a transparent solid to form chips, and then applying the coloring material to surfaces of the chips. The transparent solid may include one or more of an acrylic resin or a polyester resin. Preparing the surface-treated stone elements may include applying a metal to a surface of a transparent solid, and then pulverizing the transparent solid. The transparent solid may include one or more of an acrylic resin or a polyester resin.

The first material may include a polymeric resin and an inorganic filler. The polymeric resin may include an acrylic resin. The method may further include combining another type of stone elements with the surface treated stone elements and the first material, wherein the other type of stone elements may not have the coloring material disposed on surfaces thereof.

Processing the exposed surface so as to expose transparent portions of the surface-treated stone elements may include removing the coloring material from surfaces of surface-treated stone elements that are at the exposed surface. Removing the coloring material may include removing a predetermined thickness of the exposed surface. Removing the predetermined thickness of the exposed surface may include abrading the exposed surface.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION OF THE INVENTION

Figure 1:
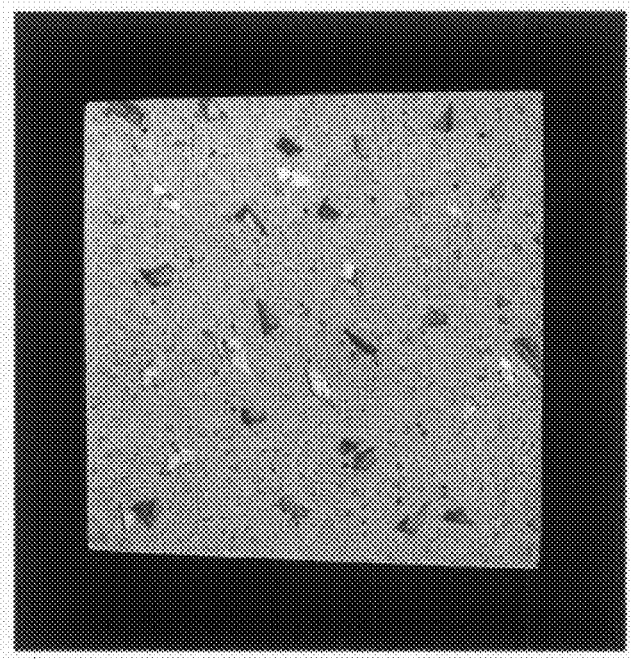
FIG. 1(a) illustrates a photograph of a surface pattern of artificial stone according to an example embodiment, in which transparent stone elements are coated with silver powder.
FIG. 1(b) illustrates a photograph of a surface pattern of artificial stone according to an embodiment, in which transparent stone elements are coated with aluminum.
Figure 1:
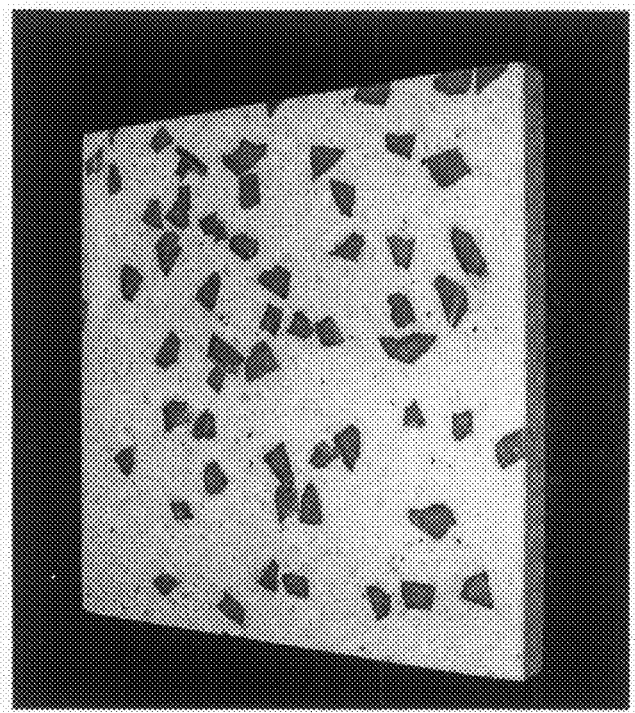

Korean Patent Application No. 10-2004-0104771, filed on Dec. 13, 2004, in the Korean Intellectual Property Office, and entitled: "ARTIFICIAL MARBLE CONTAINING THREE-DIMENSIONAL TRANSPARENT MARBLE CHIP AND METHOD FOR PREPARING THE SAME," is incorporated by reference herein in its entirety.

Example embodiments relate to an artificial stone, e.g., an artificial marble, in which transparent stone elements are expressed three-dimensionally by preparing an artificial stone shape, the artificial stone including transparent stone elements that are embedded in the artificial stone and which have been surface-treated with a coloring material, and processing the artificial stone shape, e.g., by abrading, sanding, etc., so as to expose transparent portions of the surface-treated stone elements. The transparent surface of the stone elements may be exposed at a surface of the artificial stone shape, such that the artificial stone has a sparkling pattern which resembles a stone beset with gems. Thus, example embodiments may provide an artificial stone in which colored transparent stone elements are expressed three-dimensionally, giving the artificial stone a sumptuous feeling.

The surface-treated transparent elements may be prepared by curing a resin, e.g., an organic polymer such as an acrylic resin, an unsaturated polyester resin, an organosilicon resin, etc., using heat, light, etc., to obtain a transparent solid, followed by pulverizing the transparent solid. In an implementation, an acrylic resin mixture may be prepared using an acrylic monomer in an amount equal to or more than about 70% by weight, based on the total weight of the acrylic resin mixture, and a polyacrylate in an amount equal to or less than about 30% by weight, based on the total weight of the acrylic resin mixture. Other components may also be included. Polymerization may be induced by a polymerization initiator added to the mixture. The acrylic monomer may include one or more of, e.g., methyl acrylate, ethyl acrylate, butyl acrylate, methyl methacrylate, ethyl methacrylate, butyl methacrylate, acrylic acid derivatives, mixtures of the forgoing listed monomers, etc. The unsaturated polyester resin can be obtained by, e.g., a polycondensation reaction between an unsaturated dicarboxylic acid, such as maleic acid, maleic anhydride, fumaric acid, etc, and a polyol component, such as ethylene glycol, diethylene glycol, propylene glycol, dipropylene glycol, 1,3-butanediol, 1,6-hexanediol, neopentyl glycol, 1,4-cyclohexanediol, glycerine, pentaerythritol, etc.

The size of the transparent stone elements used in the present invention may vary depending on, e.g., the particular appearance that is desired in the artificial stone. In an implementation, an average size of the transparent stone elements may be about 0.1 mm to about 5 mm.

The transparent stone elements may be entirely or partially surface-treated with the coloring material. The transparent stone elements may be formed from the transparent solid by fragmenting the transparent solid, e.g., by pulverizing. The surface treatment may be applied to the monolithic piece before fragmentation. In another implementation, the transparent stone elements may be initially formed by a suitable process, which may include fragmentation of the transparent solid, separate formation of unit transparent stone elements by molding, etc., and the surface treatment may be subsequently applied to the transparent stone elements. The surface treatment may be performed before the transparent stone elements are mixed with a base material, e.g., a resin mixture, for the artificial stone.

In an implementation, the surface treatment may include processes such as coating, deposition, etc. The transparent stone elements may be entirely or partially covered with the coloring material. The coloring material may include, e.g., paint and/or metal. Where a paint is employed as a surface treatment, the paint may include, e.g., an organic paint, an inorganic paint, etc. The paint may be applied using a suitable process. Where a metal is employed as a surface treatment, the metal may be, e.g., gold, silver, copper, aluminum, and/or nickel, which may be deposited using a suitable process.

In an implementation, the surface-treated stone elements may be prepared by depositing a metal on a surface of a transparent solid resin plate, and pulverizing the metal-deposited solid resin plate. In this case, the resulting pulverized stone chips need not be subjected to a coating process.

Figure 2A:
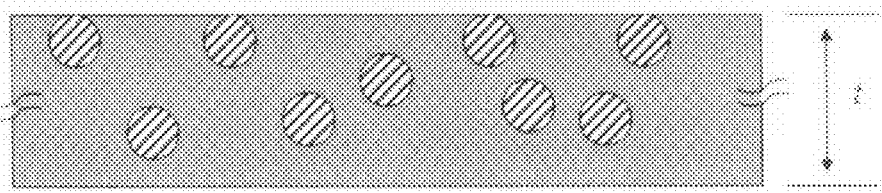
FIGS. 2A and 2B illustrate, schematically, cross-sections of stages in preparing an artificial stone according to an example embodiment.
Figure 2B:
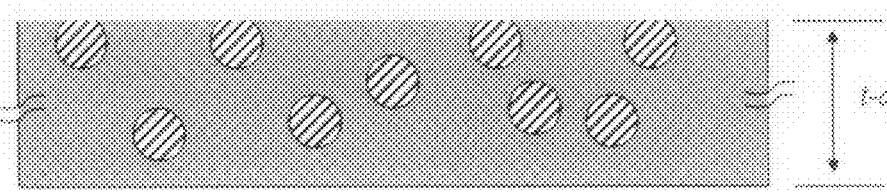

FIGS. 2A and 2B illustrate, schematically, cross-sections of stages in preparing an artificial stone according to an example embodiment. After mixing the surface-treated stone elements with the base material for the artificial stone, the resulting mixture may be formed into a shape having an exposed surface. For example, the surface-treated stone elements may be mixed with a resin, which may then be cured using a suitable process to form a hardened shape. In other implementations, the base material may be a hardenable material such as concrete, mortar, a thermoplastic, etc., depending on the use to which the artificial stone will be put.

The base material for the artificial stone may include one or more polymeric resins and an inorganic filler. The polymeric resin may be, e.g., an acrylic resin or unsaturated polyester resin, preferably acrylic resin. The base material may further include other stone elements, whether artificial or real, including, e.g., artificial stone elements that have not been surface treated, and which may be transparent, translucent, and/or opaque.

In an implementation, the surface-treated stone elements may be added to the base material in a ratio of, e.g., about 0.1 to about 150 parts by weight, based on 100 parts by weight of acrylic resin in the base material, which may provide a desirable aesthetic appeal. The surface-treated stone elements may be present in the artificial stone in an amount greater or less than that of the base material, e.g., greater or less than the amount of acrylic resin. The order of mixing may include adding the surface-treated stone elements to the base composition, adding the base composition to the surface-treated stone elements, etc.

The surface-treated stone elements may be mixed with the base material to form a curable composition, which may then be cured using a suitable process. For example, the curable composition may be poured onto a conveyer belt and then cured slowly while the conveyer belt is moving, or the curable composition may be cured under a large stream of hot air (hot blast), etc.

After the mixture of surface-treated stone elements and the base material is formed into a hardened shape having an exposed surface, the exposed surface may be processed, e.g., by abrading, sanding, etching, polishing, etc., so as to remove a portion of the surface treatment from surface-treated stone elements that are at the exposed surface, thereby exposing the transparent portion of the surface-treated stone elements that underlies the coloring material. Polishing or sanding may be particularly suitable processes, as they may help make the surface of the artificial stone uniform. The coloring material layer formed on the surface of the transparent stone elements by surface-treatment with the coloring material may be partially removed by the processing, e.g., polishing, of the exposed surface of the artificial stone.

After processing the surface, e.g., by polishing, the exterior portions of stone elements adjacent to the surface of the artificial stone may expose a transparent portion of the stone elements because the coloring material is removed. However, the remaining portions of the stone elements, i.e., the portions buried or embedded within the artificial stone, may still have the coloring material layer remaining on their surfaces. This remaining coloring material may make the shape of the buried or embedded portions of the stone elements distinct, so that the transparent aspect of the stone elements may express a three-dimensionally, as if gems are embedded in the surface of the artificial stone. In contrast, if transparent stone elements are used without surface-treating them in any way, the artificial stone obtained therefrom may have inferior aesthetics, and the stone elements may not express three-dimensionally.

The artificial stone shape may be processed, e.g., sanded, polished, etc., to a depth d that is sufficient to remove the coating layer and at the same time provide a smooth surface. In an implementation, a thickness d of about 0.1 to about 2 mm may be removed from the surface of the artificial stone, such that a thickness t of the artificial stone is reduced to a thickness t−d. The thickness d removed may depend on the thickness of coloring material that is coated, i.e., surface treated, on the transparent stone elements.

The above-described embodiments may be better understood with reference to the following Examples, which are intended for the purpose of illustration and are not to be construed as in any way limiting the scope of the above-described embodiments, which scope is defined by the claims appended hereto. In the following Examples, all parts and percentages are by weight, unless otherwise indicated.

Example 1

Preparation of surface-treated stone elements: a polymethylmethacrylate syrup was cured to form a transparent solid resin plate. The transparent solid resin plate was pulverized to an average size of 5 mm to obtain transparent stone elements in the form of chips. The resulting pulverized transparent stone chips were coated with silver powder.

Preparation of artificial stone (artificial marble): Subsequently, 50 parts by weight of the silver powder-coated pulverized stone chips were added to an artificial stone composition prepared by mixing 100 parts by weight of acrylic resin, 170 parts by weight of aluminum hydroxide and 2 parts by weight of azobisisobutylonitrile to form a curable composition. The curable composition was poured into a glass molding cell having a size of 300 mm×600 mm×15 mm, and cured in a hot blast oven at 45° C., then gradually heated up to 100° C. to obtain a solid article in the form of flat plate. The surface of the resulting solid article was sanded to remove a thickness of about 1 mm, so that some of the silver powder coating layer on the surface of the solid article was removed. The sanded solid article had three-dimensional transparent stone chips at its surface. A photograph of the sanded solid article is shown in FIG. 1(a).

Example 2

Preparation of transparent stone element: aluminum was deposited on the surface of a transparent polymethylmethacrylate resin sheet. The aluminum-deposited polymethylmethacrylate resin sheet was pulverized to an average size of 5 mm to obtain aluminum-deposited stone chips.

Preparation of artificial stone (artificial marble): a solid article was prepared in the same manner as in Example 1, substituting the aluminum-deposited stone chips for the silver powder-coated stone chips. A photograph of the final solid article is shown in FIG. 1(b).

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An artificial stone, comprising:
   a solid material; and
   surface-treated stone elements in the solid material, wherein:
   the surface-treated stone elements are transparent stone elements having a coloring material disposed on surfaces thereof, the coloring material includes a metal,
   transparent portions of the surface-treated stone elements are exposed at a surface of the artificial stone, and
   the transparent stone elements are entirely or partially covered by the coloring material.

2. The artificial stone as claimed in claim 1, wherein the artificial stone includes a first plurality of the surface-treated stone elements, each having a first portion within the artificial stone and a second portion exposed at a surface of the artificial stone, wherein:
   the coloring material is disposed on surfaces of the first portions of the first plurality of the surface-treated stone elements, and
   the coloring material is not disposed on surfaces of the second portions of the first plurality of surface-treated stone elements.

3. The artificial stone as claimed in claim 2, wherein the artificial stone further includes a second plurality of surface-treated stone elements that are entirely within the artificial stone, the second plurality of surface-treated stone elements being entirely covered by the coloring material.

4. The artificial stone as claimed in claim 1, wherein the metal includes one or more of gold, silver, copper, aluminum, or nickel.

5. The artificial stone as claimed in claim 1, wherein the transparent stone elements include an organic polymer.

6. A method of preparing an artificial stone, comprising:
   combining a first material and surface-treated stone elements;
   forming the combined first material and surface-treated stone elements into a solid material that has a shape having an exposed surface; and
   processing the exposed surface so as to expose transparent portions of the surface-treated stone elements at a surface of the artificial stone, wherein the surface-treated stone elements are transparent stone elements having a coloring material disposed to entirely cover or partially cover surfaces of the transparent stone elements, and the coloring material including a metal.

7. The method as claimed in claim 6, further comprising, prior to the combining, applying the coloring material to the surfaces of the transparent stone elements to prepare the surface-treated stone elements.

8. The method as claimed in claim 7, wherein preparing the surface-treated stone elements includes pulverizing a transparent solid to form chips, and then applying the coloring material to surfaces of the chips.

9. The method as claimed in claim 8, wherein the transparent solid includes one or more of an acrylic resin or a polyester resin.

10. The method as claimed in claim 7, wherein preparing the surface-treated stone elements includes applying the metal to a surface of a transparent solid, and then pulverizing the transparent solid.

11. The method as claimed in claim 10, wherein the transparent solid includes an organic polymer that includes one or more of an acrylic resin or a polyester resin.

12. The method as claimed in claim 6, wherein the first material includes a polymeric resin and an inorganic filler.

13. The method as claimed in claim 12, wherein the polymeric resin includes an acrylic resin.

14. The method as claimed in claim 6, further comprising combining another type of stone elements with the surface treated stone elements and the first material, wherein the other type of stone elements do not have the coloring material disposed on surfaces thereof.

15. The method as claimed in claim 6, wherein processing the exposed surface so as to expose transparent portions of the surface-treated stone elements includes removing the coloring material from surfaces of surface-treated stone elements that are at the exposed surface.

16. The method as claimed in claim 15, wherein removing the coloring material includes removing a predetermined thickness of the exposed surface.

17. The method as claimed in claim 16, wherein removing the predetermined thickness of the exposed surface includes abrading the exposed surface.

18. The method as claimed in claim 6, wherein the coloring material includes the metal and a paint.

19. The method as claimed in claim 6, wherein the metal includes one or more of gold, silver, copper, aluminum, or nickel.

* * * * *